United States Patent
Jonsson et al.

(10) Patent No.: US 9,516,528 B2
(45) Date of Patent: Dec. 6, 2016

(54) METHOD FOR ESTIMATING INTERFERENCE WITHIN A SERVING CELL, USER EQUIPMENT, COMPUTER PROGRAM AND COMPUTER PROGRAM PRODUCTS

(71) Applicant: Telefonaktiebolaget L M Ericsson (publ), Stockholm (SE)

(72) Inventors: Elias Jonsson, Malmö (SE); Basuki Endah Priyanto, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 14/359,601

(22) PCT Filed: Oct. 29, 2012

(86) PCT No.: PCT/EP2012/004513
§ 371 (c)(1),
(2) Date: May 21, 2014

(87) PCT Pub. No.: WO2013/075782
PCT Pub. Date: May 30, 2013

(65) Prior Publication Data
US 2014/0357255 A1 Dec. 4, 2014

Related U.S. Application Data

(60) Provisional application No. 61/564,467, filed on Nov. 29, 2011.

(30) Foreign Application Priority Data
Nov. 25, 2011 (EP) .................................... 11190784

(51) Int. Cl.
*H04W 24/08* (2009.01)
*H04W 52/16* (2009.01)
(Continued)

(52) U.S. Cl.
CPC ........... *H04W 24/08* (2013.01); *H04B 17/318* (2015.01); *H04B 17/345* (2015.01); *H04W 52/16* (2013.01)

(58) Field of Classification Search
CPC .. H04W 24/08; H04W 52/16; H04B 17/318; H04B 17/345
See application file for complete search history.

(56) References Cited

U.S. PATENT DOCUMENTS 9,136,953 B2 * 9/2015 Yoo ...................... H04B 17/345
2010/0020771 A1 1/2010 Ji et al.
(Continued)

FOREIGN PATENT DOCUMENTS

| WO | 2008071916 A1 | 6/2008 |
| WO | 2009099810 A2 | 8/2009 |
| WO | 2011137314 A1 | 11/2011 |

OTHER PUBLICATIONS

Henao, J., et al., "Advanced Receiver Signal Processing Techniques: Evaluation and Characterization", Artist4G. Advanced Radio Interface Technologies for 4G Systems, https://ict-artist4q.eu. pp. 1-25. Version 1.0.

(Continued)

*Primary Examiner* — Marcos Torres
(74) *Attorney, Agent, or Firm* — Murphy, Bilak & Homiller, PLLC

(57) ABSTRACT

The invention relates to a method 20 performed in a user equipment 8 for estimating interference within a serving cell 5 of a communication system 1. The user equipment 8 is connected to the serving cell 5 and the communication system 1 further comprising one or more neighboring cells 6, 7 to the serving cell 5. The method 20 comprises: receiving 21 neighboring cell reference signals transmitted in at least one of the neighboring cells 6, 7 and serving cell reference signals transmitted in the serving cell 5; and determining 22 a first interference estimate $1_{SC,iC}$ of interference within the serving cell 5, the first interference estimate taking into account cancellation of interference from the neighboring cell reference signals. The invention also relates to a user equipment, computer program, and computer program product.

12 Claims, 5 Drawing Sheets

(51) Int. Cl.
*H04B 17/318* (2015.01)
*H04B 17/345* (2015.01)

(56) References Cited

U.S. PATENT DOCUMENTS

| | | |
|---|---|---|
| 2011/0032908 A1 | 2/2011 | Lindoff et al. |
| 2011/0143672 A1 | 6/2011 | Yoo et al. |
| 2014/0018090 A1* | 1/2014 | Khoryaev ............ H04W 52/04 455/452.1 |

OTHER PUBLICATIONS

Third Generation Partnership Project, "3GPP TS 36.213 V10.2.0 (Jun. 2011)", 3rd Generation Partnership Project; Technical Specification Group Radio Access.Network; Evolved Universal Terrestrial Radio Access (E-UTRA); Physical layer procedures (Release 10). Jun. 2011. pp. 1-120.

* cited by examiner

METHOD FOR ESTIMATING INTERFERENCE WITHIN A SERVING CELL, USER EQUIPMENT, COMPUTER PROGRAM AND COMPUTER PROGRAM PRODUCTS

TECHNICAL FIELD

The technology disclosed herein relates generally to the field of wireless communication systems, and in particular to interference estimations within such wireless communication systems.

BACKGROUND

A heterogeneous network (HetNet) is an appealing solution for providing increased capacity to mobile users and is expected to be widely deployed in the near future. The HetNet comprises various types of cells, such as macro cells, pico cells and femto cells. In a typical layout, a macro base station provides a wide area coverage serving users within the macro cell. Within the macro cell there will be areas with high amount of traffic, i.e. high concentration of users, and areas lacking coverage (coverage holes). In those areas it would be desirable to deploy additional capacity to keep user satisfaction. In the HetNet, the added capacity is provided by deploying access nodes within the macro cell in order to concentrate a capacity boost to a smaller area, in which the capacity is needed. Such access nodes, e.g. a pico base station (of the pico cell) or a femto base station (of the femto cell), typically have lower output power and thus cover a smaller area. In the HetNet scenario, the macro base station can be seen as providing coverage while femto or pico base stations provide capacity.

In the HetNet there is a multitude of signals transmitted in the various cells. These signals cause interference, which in turn may lower the throughput performance in the HetNet and various techniques aimed at reducing interference are available. Common Reference Symbol (CRS) interference cancellation is one such technique providing one way of increasing the throughput by removing an interfering CRS signal of a neighboring cell from a received signal of a serving cell.

An estimation of interference may thus take into account the CRS interference cancellation in order to improve the accuracy of the interference estimation. There are other sources of interference as well, besides the CRS interference from other cells. The accuracy of an interference estimate affects the ability of the user equipment to decode received signals and it is thus desirable to provide as accurate interference estimates as possible.

SUMMARY

An object of the invention is to provide methods and devices for improving the accuracy of interference estimates.

The object is according to a first aspect of the invention achieved by a method in a user equipment for estimating interference within a serving cell of a communication system. The user equipment is connected to the serving cell and the communication system further comprises one or more neighboring cells to the serving cell. The method comprises: receiving neighboring cell reference signals transmitted in at least one of the neighboring cells and serving cell reference signals transmitted in the serving cell; determining a first interference estimate of interference within the serving cell, the first interference estimate taking into account cancellation of interference from the neighboring cell reference signals.

The method provides estimation of the interference within a serving cell when common reference signals from other cells have been cancelled. This is particularly valuable in heterogeneous networks wherein an accurate interference estimate is necessary for good performance of demodulation and link adaptation. The case of a user equipment being served by a smaller cell, e.g. a pico cell, may particularly well benefit from the invention, as such case is very challenging since the larger cell, e.g. the macro cell, can cause strong interference towards the smaller cell since it transmits higher power in order to have wider coverage. Other scenarios, within heterogeneous networks as well as other, may also benefit from various embodiments and aspects of the invention.

The object is according to a second aspect of the invention achieved by a user equipment of a communication system comprising a serving cell and one or more neighboring cells to the serving cell. The user equipment comprises: receiving circuitry configured to receive neighboring cell reference signals transmitted in at least one of the neighboring cells and serving cell reference signals transmitted in the serving cell; and a processing device configured to determine a first interference estimate of interference within the serving cell, the first interference estimate taking into account cancellation of interference from the neighboring cell reference signals.

Advantages corresponding to the above mentioned are achieved also for the user equipment.

The object is according to a third aspect of the invention achieved by a computer program for a user equipment of a communication system comprising a serving cell and one or more neighboring cells to the serving cell. The computer program comprises computer program code, which, when run on the user equipment, causes the user equipment to perform the steps of: receiving neighboring cell reference signals transmitted in at least one of the neighboring cells and serving cell reference signals transmitted in the serving cell; and determining a first interference estimate of interference within the serving cell, the first interference estimate taking into account cancellation of interference from the neighboring cell reference signals.

The object is according to a fourth aspect of the invention achieved by a computer program product comprising a computer program as above, and a computer readable means on which the computer program is stored.

Further features and advantages of the invention will become clear upon reading the following description and the accompanying drawings.

DETAILED DESCRIPTION OF EMBODIMENTS

Figure 1:
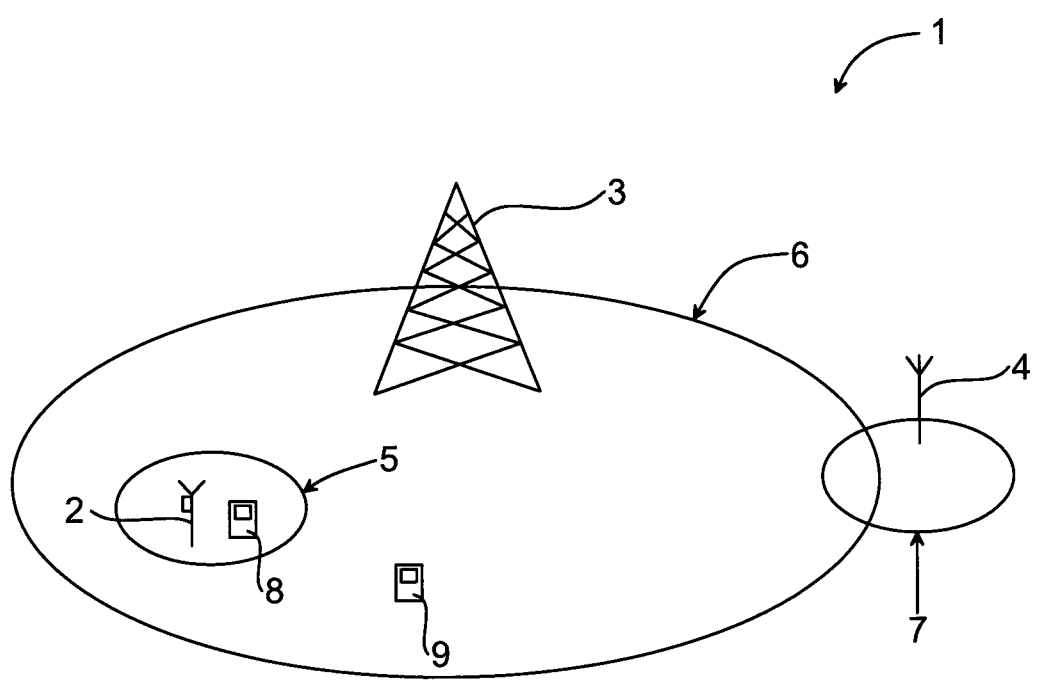
FIG. 1 illustrates schematically an environment in which embodiments of the invention may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates schematically an environment in which embodiments of the invention may be implemented. In particular, a communication system 1 is illustrated comprising a first base station 2, e.g. evolved Node B in Long Term Evolution (LTE), also denoted eNB or e Node B, arranged to communicate with user equipment 8, 9 using radio frequency transmitter(s) and receiver(s), for example utilizing multiple-input multiple-output (MIMO) antenna technology. The communication system 1 may be a wireless telecommunication system for example adapting to the LTE standard. The first base station 2 is serving a first cell 5, and in the following the first base station 2 is denoted serving base station 2, and the first cell 5 is accordingly denoted serving cell 5.

The communication system 1 is further illustrated as comprising a second cell 6 and a third cell 7, both of which are also denoted neighboring cells 6, 7 in the description, as they are neighboring to the serving cell 5. The coverage area of the serving cell 5 lies entirely within the coverage area of the second cell 6, while the coverage area of the third cell 7 partly overlaps with the coverage are of the second cell 6. This is a typical HetNet scenario, wherein the serving cell 5 for example could be a pico or femto cell and the second cell 6 could be a macro cell and the third cell 7 could be a pico or femto cell. It is noted that the communication system 1 may comprise any number of cells and base stations. It is also noted that the second and third cells 6, 7 could be associated with a respective second and third base station 3, 4 or they could be associated with the serving base station 2. That is, the serving base station 2 may be the serving base station also for the neighboring cells 6, 7.

Although FIG. 1 illustrates the case of e.g. a pico or femto cell being the serving cell, the invention is applicable to scenarios wherein any other cell is the serving cell. In another scenario the user equipment is connected to the macro cell, i.e. the macro cell is the serving cell, and e.g. the pico or femto cells are the one or more neighboring cell that introduce interference.

The first user equipment 8 is connected to the serving cell 5 and is surrounded by a number of neighboring cells 6, 7 associated with the same or another base station. In each cell, cell-specific reference signals, often referred to as common reference signals (CRS), are available to all user equipment in the cell. The common reference signals (CRS) are thus transmitted in each cell 5, 6, 7 and intended for use by user equipment 8 e.g. when obtaining channel estimates for that cell.

However, the transmission of these respective common reference signals from the neighboring cells 6, 7 also causes interference when the user equipment 8 is obtaining channel estimates for the serving cell 5.

Figure 2:
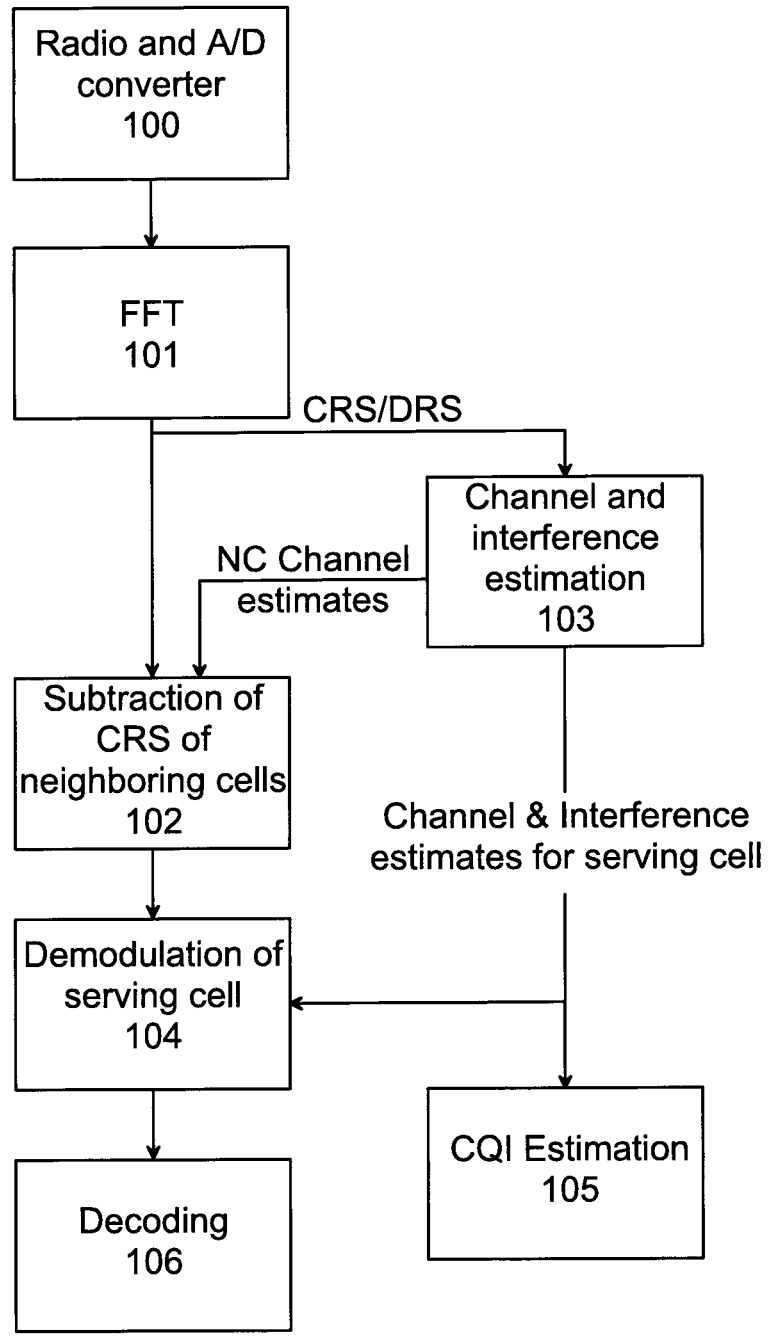
FIG. 2 is a flow chart illustrating a prior art way of performing common reference signal cancellation.

As described in the background section, an interference estimation may take into account the CRS interference cancellation in order to improve the accuracy of the resulting interference estimate. FIG. 2 illustrates in a flow chart showing various functions performed today in a user equipment for such CRS cancellation. The FIG. 2 is provided in order to enable thorough understanding of embodiments of the present invention, in relation to the prior art. In particular, at box 100 radio circuitry and analogdigital (AD) converter 100 receives analog signals and converts them into a digital data stream, which is subsequently input to a discrete Fourier transformation box 101. The output from the discrete Fourier transformation box 101 is input to a CRS cancellation box 102 and to a channel estimator box 103. The channel estimator box 103 provides channel and interference estimates based on the data stream received from the discrete Fourier transformation box 101. The channel estimator box 103 outputs, to the CRS cancellation box 102, channel estimates for the neighboring cells.

The CRS cancellation box 102 thus receives the data stream from the discrete Fourier transformation box 101 and also from the channel estimator box 103. The CRS cancellation box 102 cancels from the output of the discrete Fourier transformation box 101 the CRS from other cells. The output from the CRS cancellation box 102 comprises a data stream of values from which other cell CRS interference has been removed.

The output from the CRS cancellation box 102 is input to a demodulation box 104, which also receives as input channel estimates and interference estimates for the serving cell from the channel estimator box 103. After demodulation, decoding may be performed in decoding box 106. The output from the channel estimator box 103 may also be used by a Channel Quality Indicator (CQI) estimator box 105.

Figure 3:
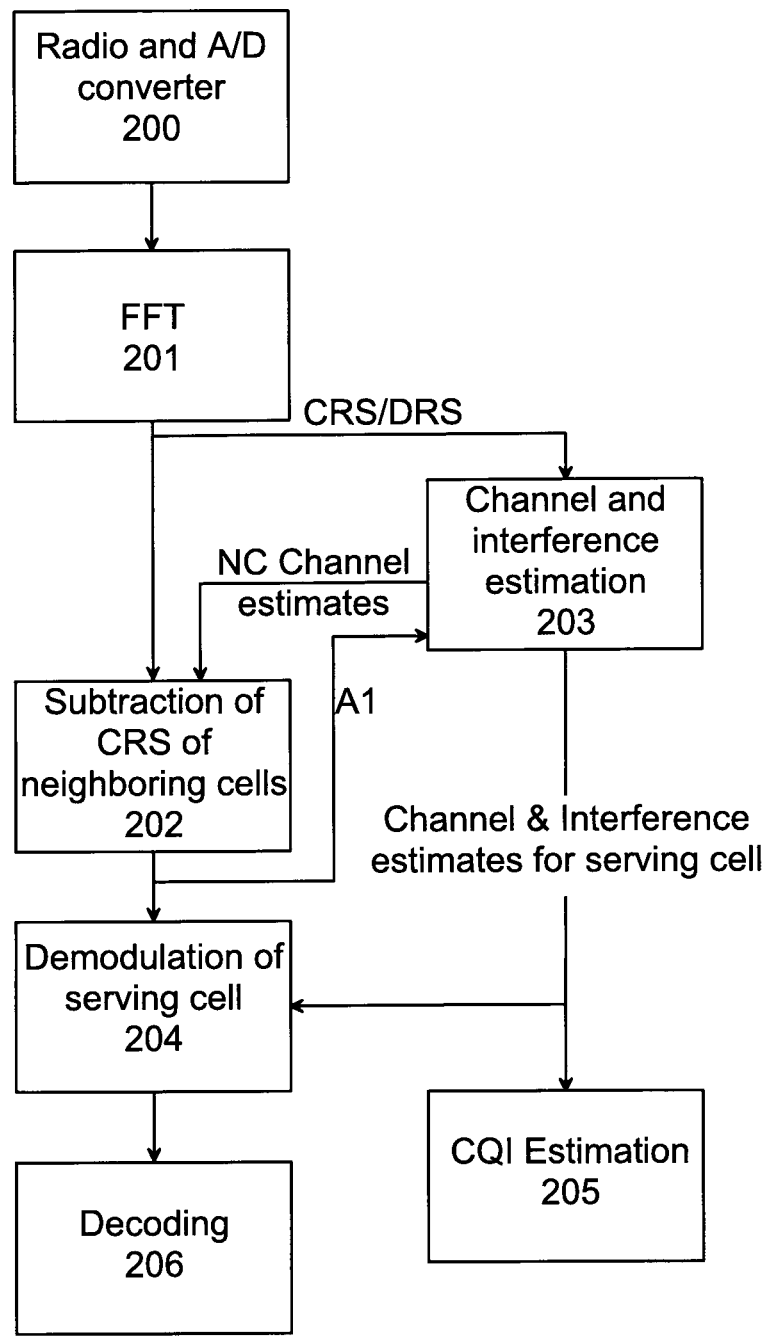
FIG. 3 is a first flow chart illustrating an aspect of the invention.

With reference now to FIG. 3, the inventors of the present invention have found a way of further improving an interference estimate. FIG. 3 is a first flow chart illustrating an aspect of the invention and is similar to the flow chart of FIG. 2.

In particular, a radio circuitry and analogdigital (AD) converter box 200 is schematically shown, and receives analog signals and converts them into a digital data stream. The digital data stream is input to a discrete Fourier transformation (DFT) box 201, e.g. a fast Fourier Transformation (FFT). That is, box 201 may implement a FFT algorithm. The output from the DFT box 201 is input to a CRS cancellation box 202 and to a channel estimator box 203.

The channel estimator box 203 provides channel and interference estimates based on the data stream received from the DFT box 201, which data stream in turn is derived from the received common reference signals. It is noted that other types of reference signals may additionally be input, e.g. dedicated reference signals (DRS) which are user specific reference signals. The channel estimator box 203 outputs to the CRS cancellation box 202 channel estimates for the neighboring cells.

The CRS cancellation box 202 thus receives the data stream from the DFT box 201 and also from the channel estimator box 203. The CRS cancellation box 202 cancels from the output of the DFT box 201 the CRS from other cells, i.e. from neighboring cells. The output from the CRS cancellation box 202 comprises a data stream of values from which neighboring cell CRS interference have been removed.

The output from the CRS cancellation box 202 is input to a demodulation box 204, which also receives as input channel estimates and interference estimates for the serving cell from the channel estimator box 203. After demodulation, decoding may be performed in decoding box 206. The output from the channel estimator box 203 may also be used by a Channel Quality Indicator (CQI) estimator box 205.

In accordance with the invention and in contrast to prior art, the output of the CRS cancellation box 202 is also input to the channel estimator box 203 (see arrow A1). Briefly, in various aspects of the invention, an interference estimation for the serving cell takes into account cancellation of CRS from the neighboring cells.

An interference matrix for the serving cell may be estimated by first determining an interference estimate using conventional methods. Modifications to this interference estimate may then be done to reflect cancellation of CRS from neighboring cells. The resulting interference estimate may then be checked for consistency before being used e.g. for demodulation and/or link adaptation. Calculations for this are described in the following.

Let $I_{SC}$ be the interference determined by using the serving cell CRS (and/or DRS). This matrix is also denoted initial $I_{SC}$ estimate. The determination can be made by correlating the difference between channel samples and their filtered values. Channel samples in turn are obtained by de-rotating the received signal on the CRS/DRS resource elements. Assuming that the user equipment 8 comprises $N_{Rx}$ receive antennas, $I_C$ is a square matrix of size $N_{Rx} \times N_{Rx}$. The interference matrix $I_{SC}$ is then split into its individual components:

$$I_{SC} = \Sigma_{i \in S_{NC}} I_{NC,i} + I_{Other} \quad \text{(eqn. 1)},$$

wherein $S_{NC}$ is the set of neighboring cells, $I_{NC,i}$ is the contribution from neighboring cell i, and $I_{other}$ is noise that is not explicitly modeled.

Let $H_{NC,i}$ denote the channel estimates in frequency domain of neighboring cell i. Here, $H_{NC,i}$ is a vector of size $N_{Rx}$. Then $$I_{NC,i} = \gamma_i H_{NC,i}(H_{NC,i})^H \quad \text{(eqn. 2)},$$

wherein, assuming the power of $H_{NC,i}$ equals the power of CRS, then $\gamma_i$ is the ratio between the received power of resource elements not carrying CRS in resource elements coinciding with the serving cell CRS and the received power of resource elements carrying the serving cell CRS. Resource elements not carrying CRS may be all other resource elements not including reference symbols, e.g. control channels.

In case the communication system 1 conforms to LTE, it is noted that Rel. 10 defines different transmission modes, and transmission mode 9 is introduced, inter alia, for supporting heterogeneous networks (refer to 3GPP TS 36.213 v10.2.0 for different transmission modes). In Rel. 10, $\gamma_i$ is set to 0 dB in case two or less transmission layers are used and −3 dB otherwise.

If the effect of the CRSS from the neighboring cells is cancelled, i.e. those contained in the set $S_{NC}$, from the serving cell physical downlink shared channel (PDSCH) resource elements, the interference is reduced for these resource elements by an amount equaling:

$$\Sigma_{i \in S_{NC}} I_{NC,i} \quad \text{(eqn. 3)}$$

It is difficult to have prior knowledge about whether the CRS resource elements of the serving cell 5 are interfered to the same extent as the PDSCH resource elements of the serving cell 5 by the set of interfering cells $S_{NC}$ (typically the neighboring cells 6, 7). In a first embodiment, it is assumed that this is indeed the case. If it turns out that the interference matrix resulting when making this assumption is not well behaved, this interference matrix is not used.

Compute $$I_{SC,IC} = I_{SC} - \Sigma_{i \in S_{NC}} \Delta_i \cdot I_{NC,i} \quad \text{(eqn. 4)},$$

wherein $\Delta_i$ is a parameter that models how many resource elements are subject to CRS cancellation in a PDSCH resource element. As an example, if a PDSCH resource block comprises 100 resource elements and 10 of these are subject to CRS cancellation, then $\Delta_i$ equals 0.1. $I_{SC,IC}$ is the interference estimate of the serving cell, wherein the interference from neighboring cells have been cancelled.

$I_{NC,i}$ can be written as (compare eqn. 3), for $\gamma_i$ equal to −3 dB:

$$I_{NC,i} = \frac{1}{2} H_{NC,i}(H_{NC,i})^H \quad \text{(eqn. 5)}$$

The choice of $\gamma_i$ equaling −3 dB is a prudent choice, leaning towards the conservative side, thus when used not subtracting too much interference, as there is no knowledge about the $\gamma_i$ value for the neighboring cell. If transmission modes including beam-forming or MIMO are employed in the neighboring cell, $I_{NC,i}$ will not be accurate, since $\gamma_i$ information is not signaled and blind detection is very difficult. Further, in the case of beam-forming, the channel estimate of neighboring cell i $H_{NC,i}$ is not the channel estimate that should be used, as the CRS used to estimate $H_{NC,i}$ is not subject to beam-forming. In order to ensure that such cases do not lead to incorrect $I_{SC,IC}$ estimates, a consistency check is employed in various embodiments.

Subtraction of interference terms ($I_{NC,i}$) are usually unstable numerical operations, since small errors in $H_{NC,i}$ could give rise to larger errors in $I_{SC,IC}$. A consistency check is therefore performed in an embodiment, by checking that the resulting $I_{SC,IC}$ is consistent. In this regards, it is noted that "consistency check" may be defined as any procedure performed for ensuring that the estimated interference comprises, and in particular is equal to, the interference intended to be estimated. The interference matrix $I_{SC,IC}$ or $I_{SC}$ is positive semi-definite by definition, meaning that their eigenvalues are larger than or equal to zero. This is in an embodiment used as the consistency check.

If any of the eigenvalues of $I_{SC,IC}$ is negative, the consistency check reveals inconsistency and $I_{SC,IC}$ is set equal to $I_{SC}$. For a matrix of size 2×2, checking for positive eigenvalues may be done by checking that the determinant is larger than zero and that the diagonal elements are larger than zero. In another embodiment of the consistency check, a less computationally demanding scheme is used, wherein only diagonal elements are checked to be larger than or equal to zero in order to confirm consistency.

If the number of neighboring cells, or generally other cells, to be CRS cancelled is low, e.g. one or two, and if the number of receive antennas of the user equipment is small, e.g. one or two or three or four, then more exhaustive searches may be done. It is noted that varying accuracy may be obtained depending on the number of calculations to be performed, which in turn depends mainly (on the available hardware resources. Thus, in various embodiments, several values of γ may be used, e.g. 0, ½ and 1 may be checked for the different cells and corresponding $I_{SC,IC}$ may be computed. Only the $\gamma_i$ combinations corresponding to consistent $I_{SC,IC}$ may then be retained. Of those combinations, the combination corresponding to the highest neighbor cell power value is selected. This selection may be done by maximizing:

$$\sum_{i \in S_{NC}} \gamma_i |H_{NC,i}|^2 \qquad \text{(eqn. 6)}$$

The different features and computations described above may be combined in various ways.

In an embodiment, a neighboring cell load detection may also be performed based on the described computations. In particular, for cases wherein $I_{SC, IC}$ is not consistent, this may be seen as an indication that the neighboring cell is lightly loaded, e.g. is only transmitting CRS. This can be concluded as in such cases very few terms should be subtracted from the initial $I_{SC}$ estimate (compare eqn. 1).

In another embodiment, $P_{SC}$ is the power of the PDSCH for the serving cell 5 for a given resource element. Assuming that the previously described neighboring cell CRS cancellation has been carried out before computing the power, the following is true (compare also eqn. 4):

$$I_{SC,IC} = P_{SC} - \gamma_{SC} H_{SC} (H_{SC})^H \qquad \text{(eqn. 7)},$$

wherein $I_{SC,IC}$ is the interference matrix after CRS cancellation of neighboring cells and $H_{SC}$ is the channel estimates for the serving cell 5. This embodiment for determining the interference within the serving cell taking into account cancellation of interference from the neighboring cell CRSs comprises rather simple calculations. However, the magnitude of the term that is subtracted in eqn. 7, i.e. $\gamma_{SC} H_{SC} (H_{SC})$, is large and may yield large numerical errors. In case the serving cell 5 employs beam-forming or MIMO, then $H_{SC}$ in $\gamma_{SC} H_{SC} (H_{SC})$ should be replaced with its beam-formed counterpart, and in case of MIMO each stream needs to be cancelled separately.

It is noted that for communication systems employing 16QAM and 64QAM modulation schemes, or LTE transmission mode 9, $\gamma_{SC}$, is signaled by the communication system. For other cases $\gamma_{SC}$ needs to be estimated, for example by computing the power ratio between CRS and PDSCH signals.

In still another embodiment, the received reference signal power (reference signal received power, RSRP), i.e. the power of the CRSs from the different cells, is monitored. If the serving cell RSRP is lower (weaker) than the sum of the RSRP of the cells to be cancelled, then the $I_{SC,IC}$ is computed as in eqn. 7, else eqn. 4 is used. This embodiment is described more in detail in the following with reference to FIG. 4.

Figure 4:
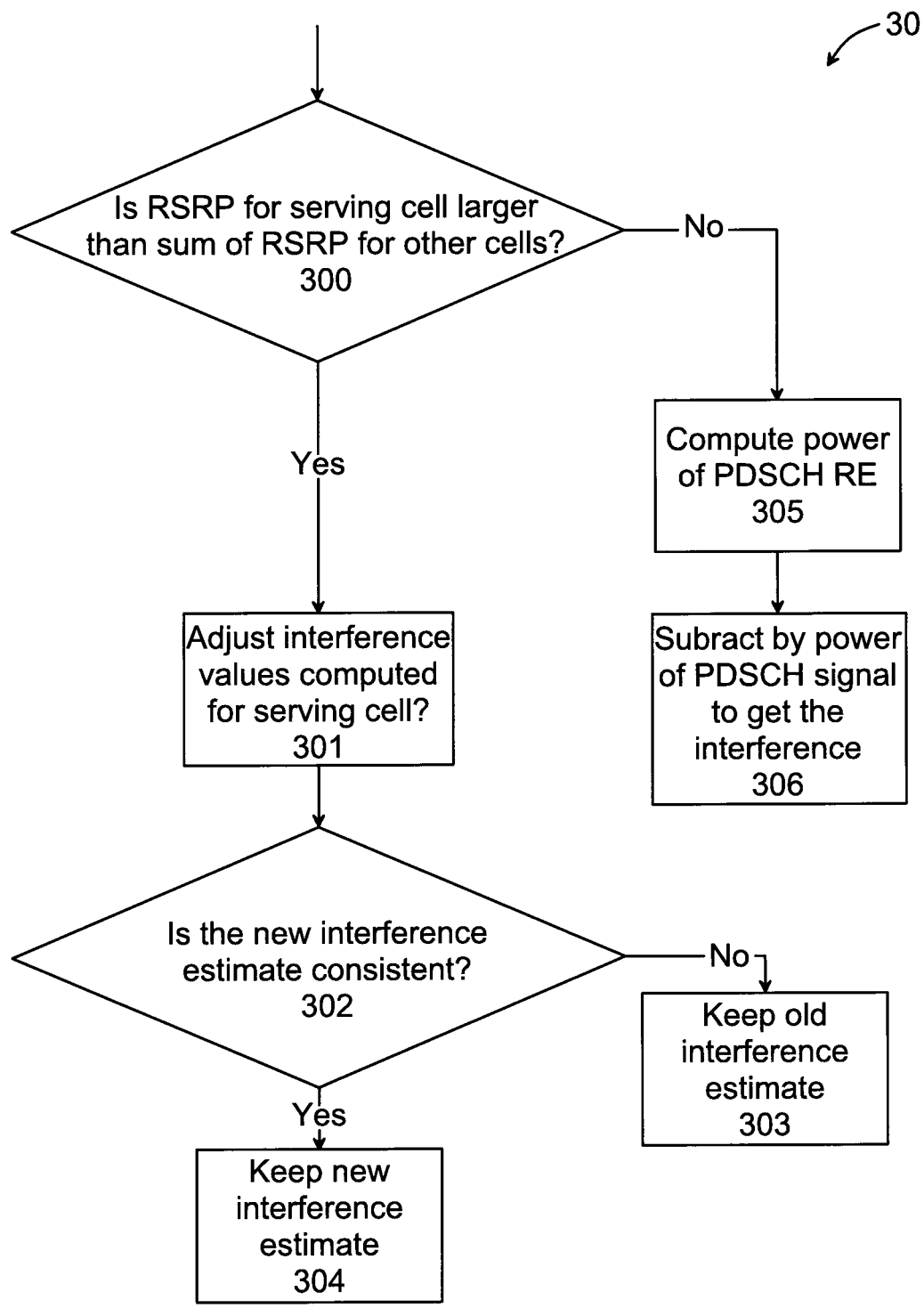
FIG. 4 is a second flow chart illustrating another aspect of the invention.

FIG. 4 is thus a second flow chart 30 illustrating another aspect of the invention. At box 300, it is checked whether the RSRP for the serving cell 5 is larger than the sum of the respective RSRP of the neighboring cells 6, 7. If this is not the case, then the flow continues to box 305, wherein the power of PDSCH resource elements is calculated. The flow then ends in box 306, wherein the interference $I_{SC,IC}$ in the serving cell is determined e.g. by using eqn. 7. That is, determining the interference $I_{SC,IC}$ by subtracting from the power of PDSCH signal the interference $I_{NC\ i}$, from the neighboring cells.

If, in box 300, it is determined that the RSRP for the serving cell 5 is larger than the sum of the respective RSRP of the neighboring cells 6, 7, then the flow continues to box 301. In box 301 it is determined whether the interference values computed for the serving cell 5 should be adjusted (refer also to eqn. 4 and related description). That is, it is determined whether and to which extent any of neighboring cell interference $I_{NC,i}$ should be adjusted for in the interference values computed for the serving cell 5.

The flow continues to box 302, wherein a consistency check is performed, to see if the interference estimate that takes into account cancellation of neighboring cell CRS is consistent. If the consistency check reveals consistency, then the flow ends in box 304 wherein the interference estimate that takes into account cancellation of neighboring cell CRS is used. If the consistency check reveals inconsistency, then the flow ends in box 303 wherein the interference estimate not taking into account cancellation of neighboring cell CRSs is used.

It is noted that proper averaging across time and frequency is assumed throughout the description. By averaging interference estimates over time and frequency uncertainty of the interference estimates is reduced. The amount of averaging may be adapted to the particular application at hand, e.g. perfoming less averaging if delay spread of the channel is large.

Figure 5:
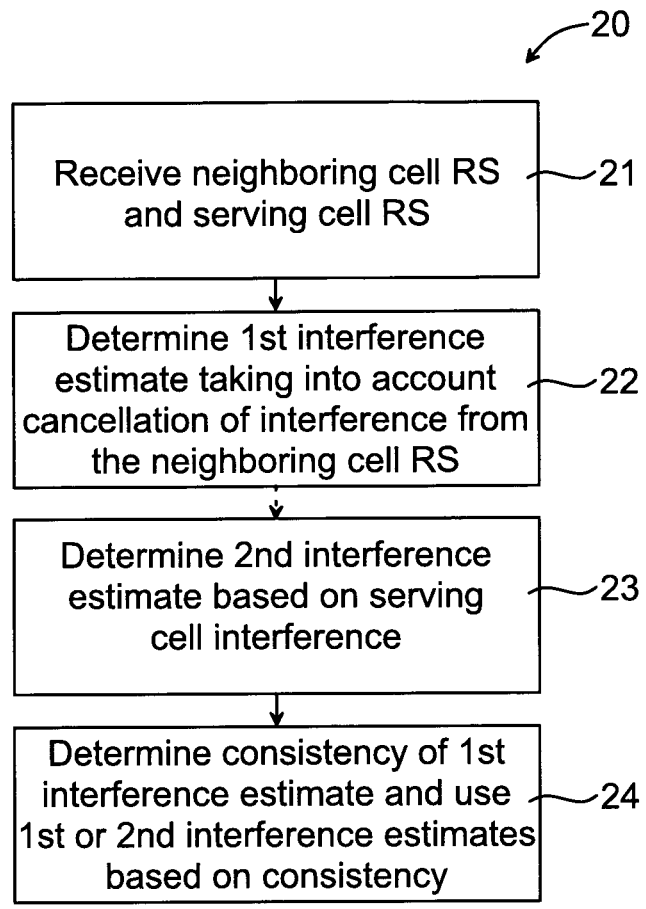
FIG. 5 is a flow chart of steps of a method in accordance with an embodiment.

The described algorithms and calculations may be implemented as a method that is performed in a user equipment, e.g. the user equipment 8, 9 as illustrated in FIG. 1, for estimating interference within its serving cell 5 of the communication system 1. As described in relation to FIG. 1, the user equipment 8 is connected to the serving cell 5 and the communication system 1 further comprises one or more neighboring cells 6, 7, i.e. neighboring to the serving cell 5. With reference to FIG. 5, a method 20 may be implemented and performed in the user equipment 8, comprising the receiving 21 of neighboring cell reference signals transmitted in at least one of the neighboring cells 6, 7 and serving cell reference signals transmitted in the serving cell 5. This can be done in conventional manner.

The method 20 further comprises determining 22 a first interference estimate $I_{SC,IC}$ of interference within the serving cell 5, wherein the first interference estimate takes into account cancellation of interference from the neighboring cell reference signals. This provides an improved accuracy of the interference estimate and subsequently, when used e.g. in channel estimation, increased performance of e.g. demodulation and link adaptation is provided.

In an embodiment, the method 20 comprises determining 23 a second interference estimate of interference within the serving cell 5 based on the serving cell reference signals; and determining 24 consistency of the first interference estimate and estimating the interference by the first interference estimate for comparisons yielding consistency of the first interference estimate, and estimating the interference by the second interference estimate for comparisons yielding non-consistency. That is, one of the earlier described consistency checks is performed to see which interference estimate to use.

In the above embodiment, the consistency of the first interference estimate may be determined to exist if all eigenvalues of an interference matrix $I_{SC,IC}$, providing the first interference estimate, are positive.

In an embodiment, the determining 22 of a first interference estimate comprises determining a first set of interference matrices $I_{NC,\ i}$, wherein each interference matrix $I_{NC,\ i}$ is based on i:th neighboring cell reference signals, the i:th neighboring cell reference signals being transmitted in a respective one of the one or more neighboring cells 6, 7; determining a second interference matrix $I_{SC}$ based on the received serving cell reference signals; and determining the first interference estimate by subtracting each interference matrix $I_{NC,i}$ of the first set of interference matrices $I_{NC,i}$ from the second interference matrix $I_{SC}$. For this embodiment, compare eqn. 4 and related description.

In the above embodiment, the method 20 may further comprise multiplying, before the subtracting, each interference matrix $I_{NC,i}$ of the first set of interference matrices $I_{NC,i}$ with a parameter $\Delta_i$, the parameter $\Delta_i$ relating the number of resource elements of the serving cell reference signals that are subject to cancellation of interference from received neighboring cell reference signals to the total number of resource elements of a resource block. For this embodiment, again compare eqn. 4 and related description.

Alternatively, the determining of the interference matrices $I_{NC,i}$ of the first set of interference matrices $I_{NC,i}$ comprises calculating $$I_{NC,i} = \gamma_i H_{NC,i}(H_{NC,i})^H,$$

wherein $H_{NC,i}$ is a channel estimate for a channel to the i:th neighboring cell 6, 7 and $\gamma_i$ is the ratio between power of resource elements carrying reference symbols and power of reference elements not carrying reference symbols.

In a variation of the above embodiment, the $\gamma_i$ is set equal to 0 if a determined rank indicator is equal to 1 or 2, and setting $\gamma_i$ equal to −3 if the determined rank indicator is larger than 2. The user equipment 8 conforming to LTE standard, is able to calculate a rank indicator, which indicates the number of spatial multiplexing layers recommended by the user equipment 8. The $\gamma_i$ is then set in dependence on this rank indicator.

The value of $\gamma_i$ may be received from a base station, e.g. from the base station 2 serving the serving cell 5.

In an embodiment, the determining of the second interference matrix $I_{SC}$ comprises correlating the difference between channel samples of the received serving cell reference signals and the filtered values of the channel samples.

In an embodiment, the determining of the first interference estimate $I_{SC,IC}$ is performed by calculating $$I_{SC,IC} = P_{SC} - \gamma_{SC} H_{SC}(H_{SC})^H,$$

wherein $P_{SC}$ is the power of a given resource element of a channel for the serving cell 5, $\gamma_{SC}$ is a ratio of power of serving cell reference signals and control or data channel signals for the serving cell 5, $H_{SC}$ is a channel estimate for the serving cell 5. The power of a given resource element of the channel refers to the power of the channel to be demodulated, and could be a control channel or a data channel.

In another embodiment, the determining of the first interference estimate $I_{SC,IC}$ is performed by calculating $$I_{SC,IC} = P_{SC} - \gamma_{SC} H_{SC}(H_{SC})^H,$$

wherein $P_{SC}$ is the power of a given resource element of a channel for the serving cell 5, $\gamma_{SC}$ is a ratio of power of serving cell reference signals and control or data channel signals for the serving cell 5, $H_{SC}$ is a channel estimate for the serving cell 5, if the signal power of the neighboring cell reference signals is larger than the signal power of the serving cell reference signals, and else by:
  determining a first set of interference matrices $I_{NC,i}$, wherein each interference matrix $I_{NC,i}$ is based on i:th neighboring cell reference signals, the i:th neighboring cell reference signals being transmitted in a respective one of the one or more neighboring cells 6, 7, and
  determining a second interference matrix $I_{SC}$ based on the received serving cell reference signals, and
  determining the first interference estimate by subtracting each interference matrix $I_{NC,i}$ of the first set of interference matrices $I_{NC,i}$ from the second interference matrix $I_{SC}$.

The interference estimate may be used for demodulation of serving cell 5 signals and/or for estimation of channel quality of a channel in serving cell 5.

Figure 6:
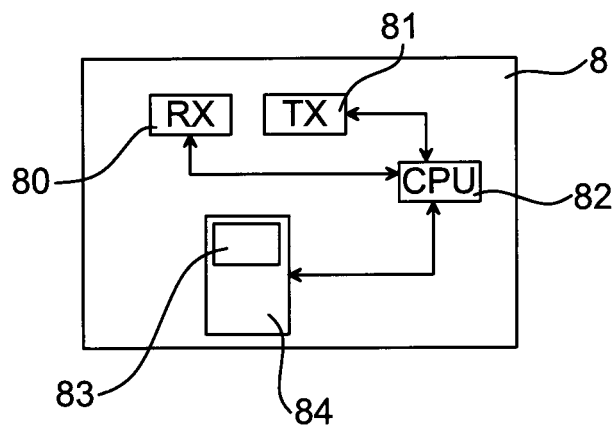
FIG. 6 illustrates exemplifying user equipment suitable for implementing embodiments of the methods.

The invention also encompasses the user equipment 8 of the communication system 1. With reference now to FIG. 6, the user equipment 8 comprises receiving circuitry 80 configured to receive neighboring cell reference signals transmitted in at least one of the neighboring cells 6, 7 and serving cell reference signals transmitted in the serving cell 5. The receiving circuitry 80 is in turn connected to physical antennas.

The user equipment 8 further comprises a processing device 82 configured to determine a first interference estimate $I_{SC,IC}$ of interference within the serving cell 5, the first interference estimate taking into account cancellation of interference from the neighboring cell reference signals. The processing device 82 e.g. a central processing unit, microcontroller, digital signal processor (DSP), etc., is capable of executing software instructions stored in a computer program product 84 e.g. in the form of a memory. The processing device 82 is connected to the receiving circuitry 80. It is noted that although only one processing device 82 is illustrated in FIG. 6, the implementation may comprise distributed hardware so that several CPUs are used rather than one when running the software.

The processing device 82 of the user equipment 8 may be configured to perform all or some of the steps of the methods as described. The processing device 82, being capable of executing software instructions, may be configured to implement and execute any of the various embodiments of the methods as described. It is noted that some or all parts of the method may, when implemented in the user equipment 8, alternatively be implemented in hardware, or any combination of software and hardware.

The described methods and algorithms or parts thereof for estimating interference within its serving cell 5 of the communication system 1 may be implemented e.g. by software and/or application specific integrated circuits in the processing device 82. To this end, the user equipment 8 may further comprise a computer program 83 stored on the computer program product 84.

With reference still to FIG. 6, the invention also encompasses such computer program 83 for estimating interference within its serving cell 5. The computer program 83 comprises computer program code which when run on the user equipment 8, and in particular the processing device 82 thereof, causes the user equipment 8 to perform the methods as described.

In particular, the computer program 33 for the user equipment 8 may comprise computer program code, which, when run on the user equipment 8, causes the user equipment 8 to perform the steps of:
  receiving neighboring cell reference signals transmitted in at least one of the neighboring cells 6, 7 and serving cell reference signals transmitted in the serving cell 5, and
  determining a first interference estimate $I_{SC,IC}$ of interference within the serving cell 5, the first interference estimate taking into account cancellation of interference from the neighboring cell reference signals.

The computer program product 84 is also provided comprising the computer program 83 and computer readable means on which the computer program 83 is stored. The computer program product 84 may be any combination of read and write memory (RAM) or read only memory (ROM). The computer program product 84 may also comprise persistent storage, which, for example can be any single one or combination of magnetic memory, optical memory, or solid state memory.

The invention claimed is:

1. A method performed in a user equipment operating in a serving cell of a communication system, the method comprising:
generating an initial estimate of interference with respect to serving cell reference signals received by the user equipment from the serving cell, said initial estimate of interference including the effects of one or more neighbor cell reference signals that interfere with reception of the serving cell reference signals at the user equipment;
estimating an interference contribution of each neighbor cell reference signal to the initial estimate of interference, based on an estimating a channel corresponding to the neighbor cell reference signal;
canceling the estimated interference contributions of the one or more neighbor cell reference signals from the initial estimate of interference, to thereby obtain a second estimate of interference that accounts for the cancellation of the estimated interference contributions;
evaluating a consistency of the second estimate of interference; and
using the second estimate of interference for at least one of demodulating serving cell data signals and estimating serving cell signal quality, responsive to determining that the second estimate of interference is consistent, and using the initial estimate of interference instead of the second estimate of interference, responsive to determining that the second estimate of interference is not consistent.

2. The method of claim 1, wherein the initial estimate of interference comprises a first matrix having matrix elements representing the combined interference of noise and the one or more neighbor cell reference signals, wherein the interference contribution of each of the one or more neighbor cell reference signals comprises a component interference matrix, and wherein canceling the estimated interference contributions of the one or more neighbor cells from the initial estimate of interference comprises subtracting the component interference matrices from the first matrix, to obtain the second estimate of interference as a second matrix representing an interference-canceled version of the first matrix.

3. The method of claim 2, wherein evaluating the consistency of the second estimate of interference comprises deeming the second interference estimate to be consistent responsive to determining that none of the Eigenvalues of the second matrix are negative, and deeming the second estimate of interference to be inconsistent responsive to determining that one or more of the Eigenvalues of the second matrix are negative.

4. The method of claim 1,
wherein estimating an interference contribution of each neighbor cell reference signal to the initial estimate of interference comprises: determining a first set of interference matrices $I_{NC,i}$, wherein each interference matrix $I_{NC,i}$ represents the interference contribution of the i:th neighboring cell reference signals, the i:th neighboring cell reference signals being transmitted in a respective i:th one of the one or more neighboring cells,
wherein generating the initial estimate of interference with respect to the serving cell reference signals comprises determining a second interference matrix $I_{SC}$ that is based on the received serving cell reference signals and does not account for any cancellation of interference arising from the one or more neighboring cell reference signals, and
wherein the second estimate of interference is obtained by subtracting each interference matrix $I_{NC,i}$ of the first set of interference matrices $I_{NC,i}$ from the second interference matrix $I_{SC,IC}$.

5. The method of claim 4, comprising multiplying, before the subtracting, each interference matrix $I_{NC,i}$ of the first set of interference matrices $I_{NC,i}$ with a parameter $\Delta_i$, the parameter $\Delta_i$ relating the number of resource elements of the serving cell reference signals that are subject to cancellation of interference from received neighboring cell reference signals to the total number of resource elements of a resource block.

6. The method of claim 4, wherein the determining of the interference matrices $I_{NC,i}$ of the first set of interference matrices $I_{NC,i}$ comprises calculating $$I_{NC,i} = \gamma_i H_{NC,i}(H_{NC,i})^H,$$

wherein the superscript H denotes the Hermitian transpose, $H_{NC,i}$ is a channel estimate for a channel to the i:th neighboring cell and $\gamma_i$ is the ratio between power of resource elements carrying reference symbols and power of reference elements not carrying reference symbols.

7. The method of claim 6, comprising setting $\gamma_i$ equal to 0 if a determined rank indicator is equal to 1 or 2, and setting $\gamma_i$ equal to −3 if the determined rank indicator is larger than 2.

8. The method of claim 6, comprising receiving the value of $\gamma_i$ from a base station serving the serving cell.

9. The method of claim 4, wherein the determining of the second interference matrix $I_{SC}$ comprises correlating the difference between channel samples of the received serving cell reference signals and the filtered values of the channel samples.

10. The method of claim 1, comprising determining the second estimate of interference, denoted as $I_{SC,IC}$, according to $$I_{SC,IC} = P_{SC} - \gamma_{SC} H_{SC}(H_{SC})^H,$$

wherein the superscript H denotes the Hermitian transpose, $P_{SC}$ is the power of a given resource element of a channel for the serving cell, $\gamma_{SC}$ is a ratio of power of serving cell reference signals and control or data channel signals for the serving cell, and $H_{SC}$ is a channel estimate for the serving cell.

11. The method of claim 1, comprising determining the second estimate of interference, denoted as $I_{SC,IC}$, according to $$I_{SC,IC} = P_{SC} - \gamma_{SC} H_{SC}(H_{SC})^H,$$

wherein the superscript H denotes the Hermitian transpose, $P_{SC}$ is the power of a given resource element of a channel for the serving cell, $\gamma_{SC}$ is a ratio of power of serving cell reference signals and control or data channel signals for the serving cell, $H_{SC}$ is a channel estimate for the serving cell, if the signal power of the neighboring cell reference signals is larger than the signal power of the serving cell reference signals, and else by:
determining a first set of interference matrices $I_{NC,i}$, as said interference contributions of the one or more neighbor cell reference signals, wherein each interference matrix $I_{NC,i}$ is based on i:th neighboring cell reference signals, the i:th neighboring cell reference signals being transmitted in a respective i:th one of the one or more neighboring cells, and determining a second interference matrix $I_{SC}$ based on the received serving cell reference signals, said second interference matrix being the initial estimate of interference, and determining the second estimate of interference by subtracting each interference matrix $I_{NC,i}$ of the first set of interference matrices $I_{NC,i}$ from the second interference matrix $I_{SC}$.

12. A user equipment configured for operation in a serving cell of a communication system, the user equipment comprising:

radio circuitry comprising receiving circuitry configured to receive signals and transmitting circuitry configured to transmit signals; and processing circuitry operatively associated with the radio circuitry and configured to:

generate an initial estimate of interference with respect to serving cell reference signals received by the user equipment from the serving cell, said initial estimate of interference including the effects of one or more neighbor cell reference signals that interfere with reception of the serving cell reference signals at the user equipment;

estimate an interference contribution of each neighbor cell reference signal to the initial estimate of interference, based on an estimating a channel corresponding to the neighbor cell reference signal;

cancel the estimated interference contributions of the one or more neighbor cell reference signals from the initial estimate of interference, to thereby obtain a second estimate of interference that accounts for the cancellation of the estimated interference contributions;

evaluate a consistency of the second estimate of interference; and use the second estimate of interference for at least one of demodulating serving cell data signals and estimating serving cell signal quality, responsive to determining that the second estimate of interference is consistent, and using the initial estimate of interference instead of the second estimate of interference, responsive to determining that the second estimate of interference is not consistent.

* * * * *